United States Patent
Anzellotti et al.

(10) Patent No.: US 8,179,944 B2
(45) Date of Patent: May 15, 2012

(54) ADHESIVE PROTECTIVE COATING WITH SUPRESSED REFLECTIVITY

(75) Inventors: Jay F Anzellotti, Rochester, NY (US); Horst Schreiber, Rochester, NY (US)

(73) Assignee: Corning Incorporated, Corning, NY (US)

(*) Notice: Subject to any disclaimer, the term of this patent is extended or adjusted under 35 U.S.C. 154(b) by 0 days.

(21) Appl. No.: 12/906,430

(22) Filed: Oct. 18, 2010

(65) Prior Publication Data

US 2011/0122909 A1 May 26, 2011

Related U.S. Application Data

(60) Provisional application No. 61/264,419, filed on Nov. 25, 2009.

(51) Int. Cl.
*H01S 5/00* (2006.01)
*G06K 7/10* (2006.01)

(52) U.S. Cl. ........ 372/49.01; 359/350

(58) Field of Classification Search ........ 359/350; 372/49.01, 107, 50.1
See application file for complete search history.

(56) References Cited

U.S. PATENT DOCUMENTS

| | | | |
|---|---|---|---|
| 6,097,536 A * | 8/2000 | Bauer et al. | 359/350 |
| 2004/0058061 A1 | 3/2004 | Lipson et al. | |
| 2005/0153064 A1 | 7/2005 | Lipson | |
| 2006/0033984 A1 * | 2/2006 | Bruynooghe et al. | 359/350 |

FOREIGN PATENT DOCUMENTS

JP 5677838 6/1981

OTHER PUBLICATIONS

Translated Abstract of JP56077838.

* cited by examiner

*Primary Examiner* — Armando Rodriguez
(74) *Attorney, Agent, or Firm* — Walter M. Douglas

(57) ABSTRACT

The disclosure is directed to a thin-film for use in below 300 nm laser systems that can be applied to a variety of substrate types. The thin film consists of a blocking layer of a selected material and a matching structure, the matching structure consisting of 1-7 layers of a selected material. The blocking layer serves to minimize or eliminate the transmission of below 300 nm laser light into an adhesive that is used to bond the substrate to a holder. The matching layer(s) minimize internal reflectance of below 300 nm laser light from the blocking layer back into the substrate.

5 Claims, 3 Drawing Sheets

US 8,179,944 B2

ADHESIVE PROTECTIVE COATING WITH SUPRESSED REFLECTIVITY

CROSS-REFERENCE TO RELATED APPLICATIONS

This application claims the benefit of priority under 35 U.S.C. §119(e) of U.S. Provisional Application Ser. No. 61/264,419 filed on Nov. 25, 2009 in the name of inventors Jay F. Anzellotti and Horst Schreiber.

FIELD

The disclosure is directed to a method of suppressing the reflectivity in an optical assembly having a holder and a coated optical element adhesively held in the holder, the optical element being held by an ultraviolet (UV) curable adhesive. In particular, the coating on the optical element suppresses the transmission of stray light into the adhesive and back-reflectance of light into the optical element.

BACKGROUND

Excimer lasers are the illumination sources of choice for the microlithographic industry. The use of high power lasers, for example, those with pulse energy densities (fluence) above 20 mJ/cm$^2$, with pulse wavelengths below 250 nm (for example, 193 nm and below) can degrade the materials used in laser lithography systems. Adhesives, for example, UV curable adhesives, are used to hold deep ultraviolet (DUV) optical elements within a holder in an optical system. These adhesives, which are typically cured using mercury I-line UV radiation (~365 nm) can break down over time due to the constant exposure to stray DUV light (for example, less than 250 nm), causing the optical components to become unstable in their mounts and eventually causing premature failure of the system. U.S. Pat. No. 6,097,536 describes the use of a single-layer thin film deposited on the optical component where it contacts the adhesive to. The layer consists of a dielectric material that is non-transmitting (blocking) at the wavelength of the optical system but transmits at the wavelength of the UV-curing process. However, there can be back-reflectance from the dielectric coating into the optical component. Thus, it is desirable to reduce the amount of light reflected by the coating back into the component due to stray light concerns. Accordingly, the present disclosure is directed to the use of an additional layer or layers that are added between the blocking dielectric layer and the component which significantly reduce the reflectance.

SUMMARY

The disclosure is directed to a thin-film for use in below 300 nm laser systems that can be applied to a variety of substrate types. The thin film consists of a blocking layer of a selected material and a matching structure, the matching structure consisting of 1-7 layers of a selected material. The blocking layer serves to minimize or eliminate the transmission of below 300 nm laser light into an adhesive that is used to bond the substrate to a holder. The matching layer(s) minimize internal reflectance of below 300 nm laser light from the blocking layer back into the substrate. In one embodiment the blocking layer is made of a material that does not transmit light below 300 nm, but does transmit light at wavelengths above 300 nm, for example, at 365 nm to cure adhesives. In another embodiment the blocking layer is made of a selected material that does not transmit light below 250 nm, but does transmit light at wavelengths above 250 nm, for example, at 365 nm to cure adhesives. The thin films disclosed herein can be used on lenses, prisms and windows used in laser systems.

For applications where UV-curing of the adhesive is unnecessary, metals or other non-transmitting materials that do not transmit UV can be applied to protect the adhesive. In this case, significant reduction of reflectivity is also possible by the same method disclosed herein.

For applications where the adhesive does not require UV-curing, but visible transmission is required so the operator has visual feedback of the process of adhesively bonding the optical element to a holder. In this instance the blocking layer is thin and transmissive to visible light, but not below 300 nm light.

In one embodiment the disclosure is directed to a shaped optical element having faces for the entry and exit of laser light and an edge defined by the faces, said element consisting of a substrate and a thin film deposited on at least a portion of the edge, said thin film consisting of at least one layer of at least one index matching material deposited on top of the substrate and a blocking layer material deposited on top of said at least one matching layer. In one embodiment the thin film consists of 1-7 layers of at least one index matching and a blocking layer, each of said index layers having a thickness in the range of 5 nm to 50 nm, and said blocking layer having a thickness in the range of 20 nm to 400 nm. In another embodiment the thin film consists of 1-4 layers of at least one index match material and a blocking layer, each of said index layers having a thickness in the range of 5 nm to 50 nm, and said blocking layer having a thickness in the range of 20 nm to 400 nm. The foregoing layers of index match material consists of alternating index matching materials selected from the group consisting of $Nb_2O_5$, $Al_2O_3$, $HfO_2$, $SiO_2$, $Y_2O_3$, $MgF_2$, $LaF_3$, $GdF_3$, $AlF_3$, $Ta_2O_5$ and $TiO_2$, and mixtures thereof. The blocking material is selected from the group consisting of $NiCrNb_2O_5$, $TiO_2$, $TaO_2$ and metals selected from the group consisting of Ni, Cr, Al and Ti, and mixtures thereof. The substrate is selected from the group consisting of silica, fused silica, high purity fused silica, fluorine-doped fused silica, calcium fluoride and magnesium fluoride.

DETAILED DESCRIPTION

The optical element and coating thereon described herein are for use in lasers systems operation at wavelengths below 300 nm; for example without limitation, 266 nm, 248 nm and 198 nm. The optical element' coating blocks light below 300 nm from passing through the coating while allowing for greater than 300 nm light to pass through the coating. Herein the "blocking or blocking material or layer" is a material that blocks or absorbs below 300 nm light wavelengths. For wavelengths below 250 nm materials such as $Ta_2O_5$ can be used as a blocking material. However, higher wavelengths that are commonly used in lasers, for example, 257 nm and 266 nm, require materials with longer absorption edges, for example without limitation $Nb_2O_5$ and $TiO_2$. Also herein the "matching materials or layer" modify the admittance of the absorbing layer so that it matches the admittance of the substrate. Admittance and refractive index are roughly equal terms, but admittance is more exact because it can be extended to multiple layers and angles.

Figure 1:
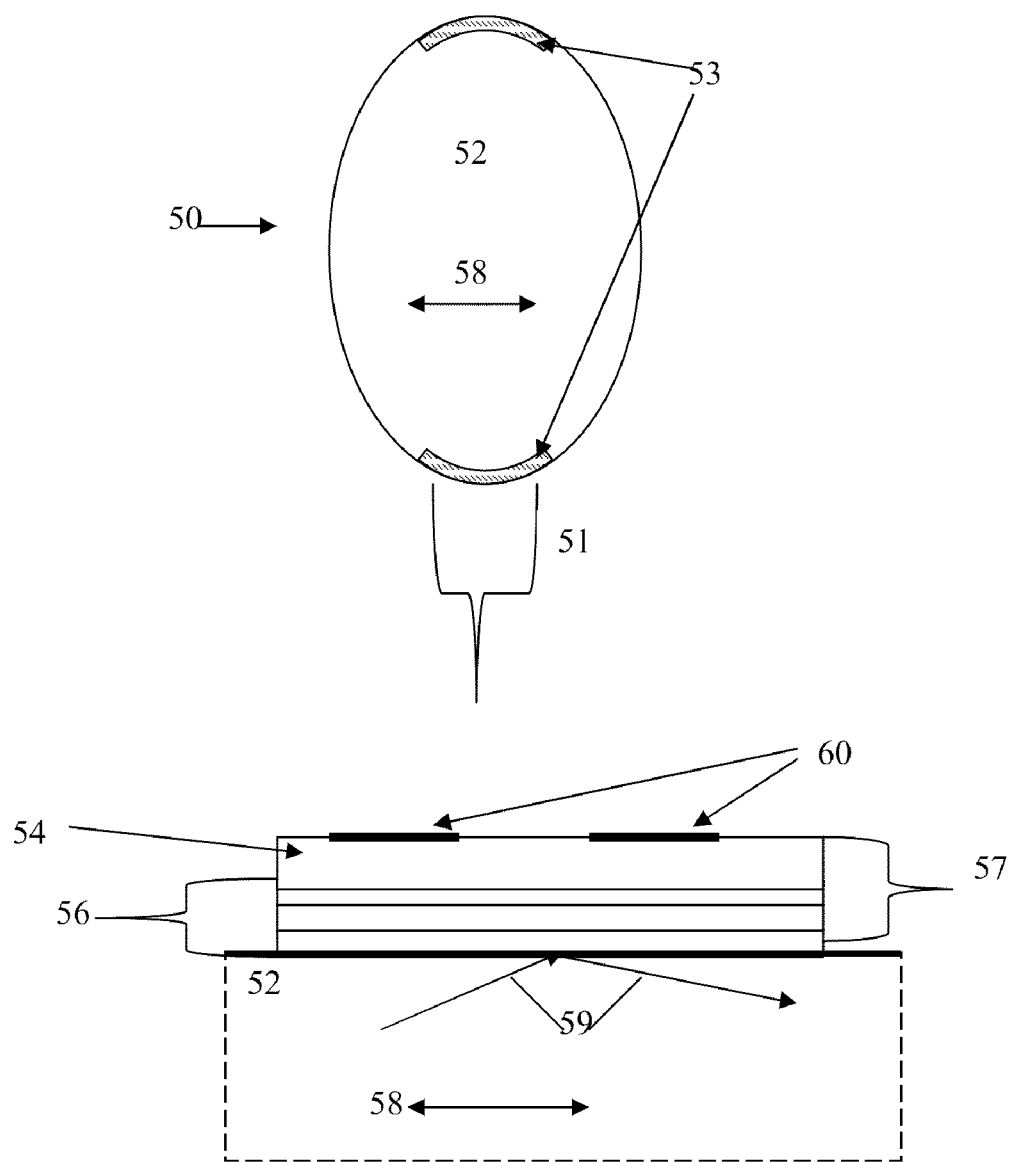
FIG. 1 is an illustration of an optical element 50 consisting of a substrate 52 having a plurality of matching layers 56, a blocking layer 54 and an adhesive 60 on at least a portion of the blocking layer for bonding the optical element 50 to a holder (not illustrated), and an expanded view of thereof.

FIG. 1 illustrates an optical element 50 in a holder, a portion of which holder is represented by numerals 53, for use in below 300 nm laser systems. The holder can be continuous or segmented about the edge of element 50. An edge portion of element 50 is illustrated in an expanded view (as indicated by bracket and arrow 51) to illustrate the disclosure herein.

As illustrated in the expanded view, the optical element consists of a substrate 52 having a thin film 57 consisting of 1-7 layers of a matching material 56 (3 layers are illustrated) and a blocking layer 54. In one embodiment the number of matching layers is in the range of 1-4. The blocking and matching layers as disclosed herein are deposited around the edge of element that will be held in a holder The blocking layer 54 serves to minimize or eliminate the transmission of laser light into an adhesive 60 that is used to bond the edge of the optical element to a holder (not illustrated I the expanded view). The matching layer(s) minimize reflectance from the blocking layer back into the substrate. The matching layer(s) are first applied to the substrate and then blocking layer is applied on top of the matching layer(s). The optical elements thus consists of the combination of substrate 52 and the thin film 57, the thin film being comprised of matching layer(s) 56 and blocking layer 54. The optical element can be mounted into a holder using an adhesive material 60. The adhesive is applied on top of the blocking layer either in segments as illustrated or as a continuous coating on the blocking layer. Also in FIG. 1, the arrows 59 represent "stray" laser light striking on and being reflected by the inner surface of the substrate 52.

The blocking layer 54 is non-transmissive at the wavelength of the laser optical system at which the optical element is being used, but it can transmit light at the wavelength of the UV curing process, which is generally the mercury I-line at approximately 365 nm. However, during operation, laser light passing through the element can strike the blocking layer and be reflected back into the optical element by the blocking layer. As a result, one or a plurality of selected materials is placed between the substrate of the optical element and the blocking layer to significantly reduce or eliminate the reflectance. For those applications where UV curing of the adhesive is not necessary the blocking layer can be a metallic layer or a layer of a material that is not UV transmissive. Examples of the deposition methods that can be used to deposit the blocking layer include, without limitation, chemical vapor deposition, plasma ion-assisted deposition, vacuum deposition using resistance heating, ion sputtering and other deposition methods known in the art.

The matching layer(s) are at least one material selected from the group consisting of $Al_2O_3$, $HfO_2$, $Y_2O_3$ and $SiO_2$ (for example without limitation, fused silica, fluorine-doped fused silica and high purity fused silica), and mixtures thereof. Oxides with significant absorption can also be used a very thin layer within the thin film; example without limitation of such materials being $Nb_2O_5$, $Ta_2O_5$, and $TiO_2$, and mixtures thereof. Further materials that can be used in the matching layer structure include metal fluorides, for example without limitation, $MgF_2$, $LaF_3$, $GdF_3$ and $AlF_3$, and mixtures thereof. The matching layer(s) in the matching structure each can have a thickness in the range of 5 nm to 120 nm, and can be deposited by methods known in the art. In one embodiment the matching layers in the matching structure can each have a thickness in the range of 5 nm to 50 nm. When oxides with significant absorption are used in the matching layer structure the thickness of these materials is at the lower end of the foregoing ranges, for example, 5-25 nm. Examples of such deposition methods include, without limitation, chemical vapor deposition, plasma ion-assisted deposition, vacuum deposition using resistance heating, ion sputtering and other deposition methods known in the art. The matching and blocking layers can be applied around the entire edge or end, or it can be applied as segments around an edge or end. When applied as segments around an edge (or other surface), the areas where the layers are not to be applied can be masked by using fixture that hold the element and obstruct the area where the coating layers are not to be applied.

The blocking layer is at least one material selected from the group consisting of $Nb_2O_5$, $TiO_2$, $Ta_2O_5$ and NiCr; and metals such as Ni, Cr, Al, and Ti, and Cr, and mixtures thereof, for example, NiCr. The blocking layer material has a thickness in the range of 20 nm to 400 nm, and can be deposited by methods known in the art. Blocking materials are selected for high absorption below 300 nm, and the higher the absorption the thinner the blocking layer can be. Examples of such deposition methods include, without limitation, chemical vapor deposition, plasma ion-assisted deposition, vacuum deposition using resistance heating, ion sputtering and other deposition method known in the art.

The substrate materials can be any material transmissive to below 300 nm light, Examples of such substrates include, without limitation, silica, fused silica, HPFS® (High Purity Fused Silica from Corning Incorporated), calcium fluoride and magnesium fluoride.

Operationally the combination of matching layer(s) and blocking layer works as follows. The blocking layer, for example, a $Nb_2O_5$ layer, will block wavelengths under 300 nm while maintaining a reasonable transmission (greater then 50%) at 365 nm (the mercury I-line where the curing of UC-curable adhesives is typically done) such that any adhesive that is used to bond an optical element to a holder can be cured. During laser operation the blocking layer also prevents below 300 nm laser light from impinging on the adhesive and ageing the adhesive, for example, by causing bonds within the adhesive materials to break. The matching layer(s) will greatly reduce amount of below 300 nm laser light reflected from blocking layer back into the substrate and ultimately from the optical system to the operational sight of the laser light. However, the matching layer(s) are made to maintain adequate transmission at the curing wavelength. For example, a niobium layer used as a single matching layer transmits about 70% of the light up to approximately a 40° angle of incidence.

Generally the laser light travels in the direction indicated by the double headed arrow 58 in FIG. 1. However, stray laser light can arise in the system due to scatter from surfaces, particularly areas where a coating is applied to the surface of a substrate or optical element, or where a substrate or optical element is held in position by holder. Stray light can also arise from the bulk material of an optical element, from the surface of an element, or by specular reflections (also called "ghosts") arising from light passing through transmitting elements.

When the stray laser light s reaches the blocking interface of a substrate and block layer (no matching materials present) it can be reflected back into the substrate. When the stray light exits the optical element and impinges on, for example, a photomask, it can cause a decrease in the definition of the circuits or elements being defined. The angle of incidence(s) of this stray light depends complete on the particular detains of the optical system. Consequently, since such details can vary from optical system to optical system, it is desirable to have a single way of preventing the reflectance problems arising from stray light. The arrows 59 in FIG. 1 illustrate how stray light have be reflected from inside the substrate.

Figure 2:
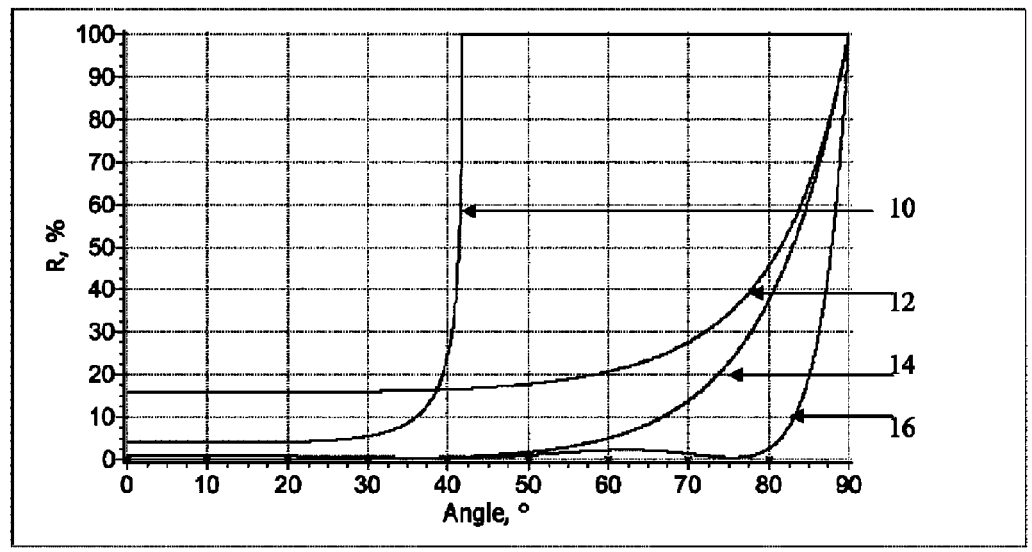
FIG. 2 is a graph illustrating the modeled reflectance for average polarization versus angle of incidence at 266 nm for light striking the outer surface of coated and uncoated substrates from the inside.

FIG. 2 illustrates the modeled reflectance for average polarization versus angle of incidence at 266 nm for laser light striking the outer surface of the substrate from inside. The blocking and matching layers were deposited as described above. The curves illustrated in FIG. 1 are:

Curve 10: No coating. [Substrate only]
Curve 12: Substrate with 300 nm thick $Nb_2O_5$ layer (20) only. [Substrate/300 nm $Nb_2O_5$]
Curve 14: Substrate with a 25 nm thick $HfO_2$ matching layer (22) and a 300 nm thick $Nb_2O_5$ layer (20) blocking layer). [Substrate/25 nm $HfO_2$/300 nm $Nb_2O_5$]
Curve 16: Substrate with a 4-layer matching structure consisting of alternating $Al_2O_3$ (24) and $HfO_2$ (22) layers (with $Al_2O_3$ layer being the first layer applied to the substrate), and layer a 300 nm thick $Nb_2O_5$ blocking layer (20). The specific thickness used in this example, in are 25 nm $Al_2O_3$, 52 nm $HfO_2$, 64 nm $Al_2O_3$, and 48 nm $HfO_2$. [Substrate/25 nm $Al_2O_3$/52 nm $HfO_2$/64 nm $Al_2O_3$/28 nm $HfO_2$/300 nm $Nb_2O_5$]

The substrate 52 was fused silica in all cases. The $Nb_2O_5$ layer absorbs at 266 nm, with a modeled transmission of <0.1%.

Using 20% reflectance as the reference point, the data in FIG. 2 indicates that below an angle of incidence of ~40° the curve 10 uncoated substrate reflects less than approximately 20% of the light striking the outer surface of the substrate from inside. At angles grater than 40° the amount of reflectance very sharply increases until at approximately 42° where approximately 100% of the light is reflected. The curve 12 substrate, coated with a single layer of $Nb_2O_5$, reflects less than 20% of the light striking the outer surface of the substrate from inside up to an angle of 60°. At angles above 60° the percent reflectance increases reaching 100% reflectance at 90°. The curve 14 substrate, coated with an $HfO_2$ matching layer on top of the substrate and an $Nb_2O_5$ blocking layer on top of the $HfO_2$ layer, reflects less than 20% of the light striking the outer surface of the substrate from the inside up to an angle of approximately 75°. The curve 16 illustrate a substrate on which alternating $Al_2O_3$ (24) and $HfO_2$ (22) matching layers were first applied to form a 4-layer matching structure (with an $Al_2O_3$ being the first layer applied to the substrate) followed by an $Nb_2O_5$ blocking layer on top of the 4-layer $Al_2O_3$/$HfO_2$/$Al_2O_3$/$HfO_2$ structure reflects less than 20% of the light striking the outer surface of the substrate from the inside up to an angle of approximately 85°. The data in Table 2 thus clearly indicates that the internal reflectance of stray light can be substantially decreased by inserting one or a plurality of matching layers between the substrate and the blocking layer.

Figure 3:
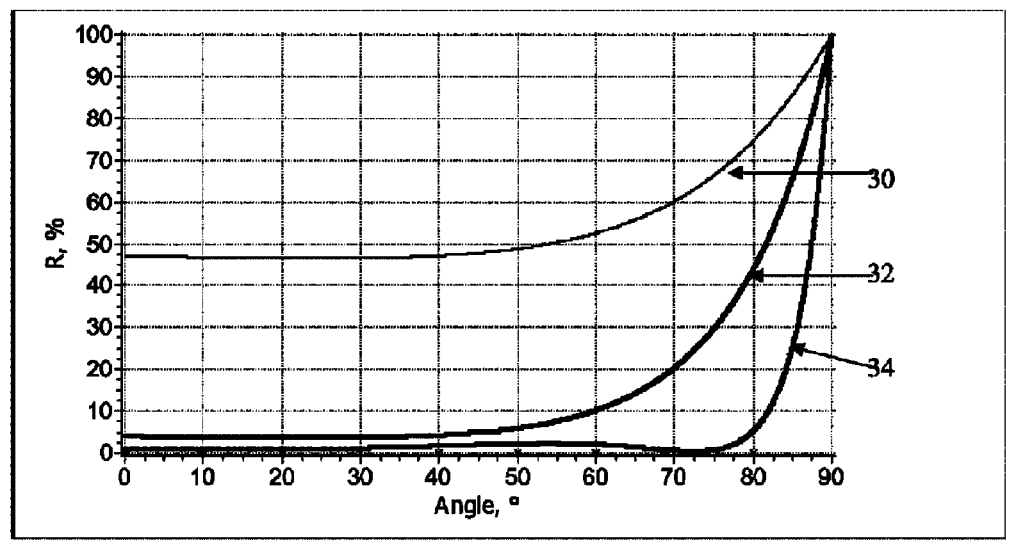
FIG. 3 is the a graph illustrating the modeled reflectance for average polarization versus angle of incident e at 266 nm for light striking the outer surface of coated and uncoated substrates from the inside.

FIG. 3 is a modeled reflectance for average polarization versus angle of incidence at 266 nm for light striking the outer surface of the substrate from inside. The plots shown are for absorbing coatings wherein:

Curve 30: a substrate with a 10 nm thick NiCr blocking layer (26) under 300 nm thick metallic aluminum (Al, (28)) coating. [substrate/NiCr/Al]
Curve 32: a substrate with a 10 nm thick NiCr blocking layer (26) under 300 nm thick Al coating (28) with an13 nm thick $Nb_2O_5$ (20) matching layer between the substrate and the Al blocking layer. [substrate/$Nb_2O5$/NiCr/aluminum]
Curve 34: a substrate with a 10 nm thick NiCr blocking layer (26) under 300 nm thick Al coating of Al (28) a 2-layer matching structure consisting of $Nb_2O_5$ (22) and $Al_2O_3$ (24) layers between the substrate and the blocking layer. The thickness of the $Al_2O_3$ and $Nb_2O_5$ layers were 66 nm and 11 nm respectively. [substrate/66 nm $Al_2O_3$/11 nm $Nb_2O5$/10 nm NiCr/ 300 nm Al]

The substrate was fused silica in all cases.

Using the 20% reflectance as the reference point, the data in FIG. 3 shows that curve 30 exceeds this value for all angles between 0° and 90°, indicating that considerable light striking the surface of the substrate. Incorporating a blocking layer between the substrate and the aluminum layer decreases the reflectance as illustrated by curve 32 to approximately 5% between and angle of 0° and 45°. Curve 32 then rises to 20% reflectance at about 70° and then continues to rise to 100% reflectance at 90°. In contrast to curves 30 and 32, curve 34, in which $Nb_2O_5$ and $Al_2O_3$ matching layers were incorporated between the substrate and the blocking layer, exhibited less than approximately 3% reflectance between 0° and approximately 77°, rose to 20% reflectance at approximately an angle of 85, and thereafter rose to 100% reflectance at an angle of 90°.

Figure 4:
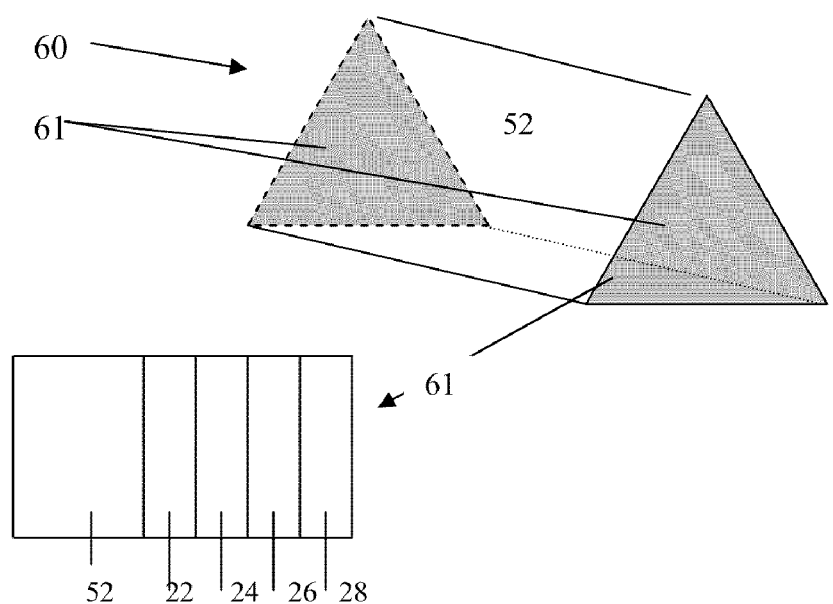
FIG. 4 is an illustration of a prism shown how a thin film with blocking and matching layers can be inserted between the prism substrate and absorbing coating on each prism end.

FIG. 4 is an illustration of a prism 60 whose ends 61 have a matching layers and a blocking layer inserted between the substrate 52 and the aluminum (Al) 28 outer layer. The side view of an end illustrates the positioning of the substrate 52, the $Nb_2O_5$ (22) and $Al_2O_3$ (24) matching layers, the NiCr (26) blocking layer and the Al (28) outer layer. The reflectance of this coating is illustrated as curve 34 in FIG. 3.

It should be noted that while a material, for example without limitation $Nb_2O_5$, can be used as either a block later or matching layer, the thickness of the layer can vary depending on the use. For example, in FIG. 2, curve 16, the $Nb_2O_5$ blocking layer has a thickness of 300 nm, whereas in FIG. 3, curve 34, where $Nb_2O_5$ is used as a matching layer, the $Nb_2O_5$ thickness is 11 nm.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

We claim:

1. An shaped optical element having faces for the entry and exit of laser light and an edge defined by the faces, said element consisting of a substrate and a thin film deposited on at least a portion of the edge, said thin film consisting of at least one layer of at least one index matching material deposited on top of the substrate and a blocking layer material deposited on top of said at least one matching layer; wherein:
    the thin film consists of 1-7 layers of at least one index matching and a blocking layer, each of said index layers having a thickness in the range of 5 nm to 50 nm, and said blocking layer having a thickness in the range of 20 nm to 400 nm, and the index matching material consists of alternating index matching materials selected from the group consisting of $Nb_2O_5$, $Al_2O_3$, $HfO_2$, $SiO_2$, $Y_2O_3$, $MgF_2$, $LaF_3$, $GdF_3$, $AlF_3$, $Ta_2O_5$ and $TiO_2$, and mixtures thereof.

2. The shaped optical element according to claim 1, wherein the thin film consists of 1-4 layers of at least one index match material and a blocking layer, each of said index layers having a thickness in the range of 5 nm to 50 nm, and said blocking layer having a thickness in the range of 20 nm to 400 nm.

3. The shaped optical element according to claim 1, wherein the blocking material is selected from the group consisting of $NiCrNb_2O_5$, $TiO_2$, $TaO_2$ and metals selected from the group consisting of Ni, Cr, Al and Ti, and mixtures thereof.

4. The shaped optical element according to claim 2, wherein the blocking material is selected from the group consisting of $NiCrNb_2O_5$, $TiO_2$, $TaO_2$ and metals selected from the group consisting of Ni, Cr, Al and Ti, and mixtures thereof.

5. The shaped optical element according to claim 1, wherein the substrate is selected from the group consisting of silica, fused silica, high purity fused silica, fluorine-doped fused silica, calcium fluoride and magnesium fluoride.

* * * * *